(12) United States Patent
Würsching et al.

(10) Patent No.: US 8,436,538 B2
(45) Date of Patent: May 7, 2013

(54) COMPACT FLUORESCENT LAMP WITH MECHANICAL SUPPORT MEANS AND STARTING AID

(75) Inventors: István Würsching, Erzsébet tér (HU); József Fülöp, Nápoly u. (HU); Ferenc Papp, Ugró Gyula u. (HU); László Bánkuti, Erdősor u. (HU)

(73) Assignee: General Electric Company, Schenectady, NY (US)

( * ) Notice: Subject to any disclaimer, the term of this patent is extended or adjusted under 35 U.S.C. 154(b) by 838 days.

(21) Appl. No.: 11/964,449

(22) Filed: Dec. 26, 2007

(65) Prior Publication Data
US 2009/0167184 A1 Jul. 2, 2009

(51) Int. Cl.
*H01J 61/54* (2006.01)

(52) U.S. Cl.
USPC .......................................... 313/594; 313/607

(58) Field of Classification Search .................. 313/594, 313/607
See application file for complete search history.

(56) References Cited

U.S. PATENT DOCUMENTS

| | | | |
|---|---|---|---|
| 4,499,396 A * | 2/1985 | Fohl et al. ........................ | 313/25 |
| 4,523,126 A | 6/1985 | Hammer et al. | |
| 6,051,930 A | 4/2000 | Hammer et al. | |
| 7,053,553 B1 | 5/2006 | Fulop et al. | |
| 2001/0003411 A1 * | 6/2001 | Honda et al. ................... | 313/607 |
| 2002/0070644 A1 * | 6/2002 | Dakin et al. ..................... | 313/25 |
| 2003/0062831 A1 * | 4/2003 | Alderman et al. .............. | 313/567 |
| 2004/0263079 A1 * | 12/2004 | Nakanishi et al. .............. | 313/631 |

(Continued)

FOREIGN PATENT DOCUMENTS

| | | |
|---|---|---|
| WO | WO 2005/099360 A2 | 10/2005 |
| WO | WO 2007/054918 A2 | 5/2007 |
| WO | WO 2007/123491 A1 | 11/2007 |

OTHER PUBLICATIONS

PCT/US2008/085469 International Search Report, mailed May 23, 2009.

*Primary Examiner* — Nimeshkumar Patel
*Assistant Examiner* — Christopher Raabe
(74) *Attorney, Agent, or Firm* — Fay Sharpe LLP

(57) ABSTRACT

The compact fluorescent lamp comprises a bulb shaped outer envelope enclosing a discharge tube having a coiled configuration and a ballast unit for controlling the current in the tube. The lamp further comprises at least one joint mechanical support and starting aid means for positioning the discharge tube and the ballast unit and reducing a breakdown voltage path of the discharge tube. The at least one mechanical support and starting aid means is made of an electrically conducting material and connected electrically to at least one of the electrodes. The neck portion has a retaining member, and the mechanical support and starting aid means is supported by the retaining member and clamped on the discharge tube at least at a location in a vicinity of a middle section of the arc path. The mechanical support means further comprises at least one support section to provide support against an apex of the outer envelope, and at least one fixing section for fixing of the discharge tube.

24 Claims, 6 Drawing Sheets

U.S. PATENT DOCUMENTS

| | | |
|---|---|---|
| 2005/0068775 A1* | 3/2005 | Iida et al. .................. 362/260 |
| 2005/0265018 A1* | 12/2005 | Yasuda et al. ............. 362/216 |
| 2006/0244359 A1 | 11/2006 | Kang |
| 2006/0255738 A1 | 11/2006 | Kwong |
| 2007/0063656 A1* | 3/2007 | Wursching et al. .......... 313/634 |
| 2008/0303402 A1* | 12/2008 | Li et al. ..................... 313/250 |

* cited by examiner

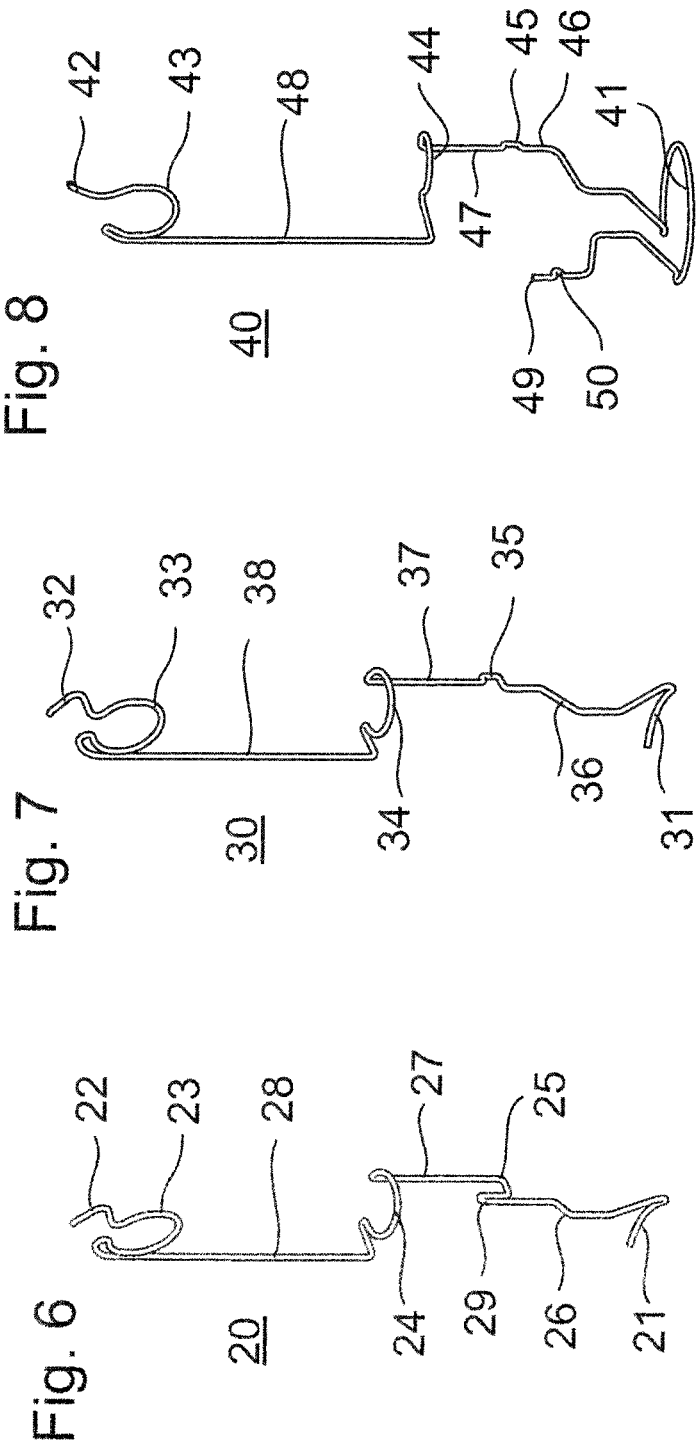

COMPACT FLUORESCENT LAMP WITH MECHANICAL SUPPORT MEANS AND STARTING AID

FIELD OF THE INVENTION

This invention relates to a compact fluorescent lamp (CFL) with a mechanical support means, and more particularly to compact fluorescent lamps that can replace incandescent lamps of general purpose. The invention also relates to a mechanical support means and a starting aid in compact fluorescent lamps for reducing the starting voltage of the lamp.

BACKGROUND OF THE INVENTION

The majority of the known and commercially available low-pressure fluorescent discharge lamps are so-called compact fluorescent lamps at present. These lamps are intended to replace incandescent lamps used in a wide field of industry and home applications. In order to provide for a CFL that resembles conventional incandescent lamps, a bulb shaped outer envelope may encapsulate the CFL-s. Main advantages of these lamps are low power consumption and long lifetime. Disadvantageous however in CFL-s is their relatively high price and length dimension. Many configurations have been proposed to solve the length dimension problem. Such solutions include multiple tube arrangements and coiled tube arrangements.

Starting voltage requirement of a low-pressure discharge lamp depends on tube length and/or tube diameter among others. A lamp with a longer tube or smaller tube diameter needs higher starting voltage. The higher starting voltage requirement in turn causes increase in size and cost of ballast components. Longer tubes are required to make higher wattage lamps; tubes with smaller diameter are required for smaller volume lamps. Both demands are driven by the market and environmental needs. Also, due to compatibility reasons, the discharge tubes shall advantageously be accommodated in an outer envelope. Additional means are needed to meet these requirements at the same time.

U.S. Pat. No. 4,523,126 describes a starting aid for shaped discharge lamps. The starting aid is a metal band secured to the discharge tube. The starting voltage reduction largely depends on the location of the starting bands. This feature implies an accurate positioning of the starting bands relative to cathode location. Experiments were conducted in order to prove the effectiveness of the solution described in the above-cited patent when applied to compact fluorescent lamps, but no significant starting voltage reduction could be accomplished. It is believed that the negative result is due to the different lamp geometry and the different filling gas. A further disadvantage of the starting aid according to the cited patent is a loss in light output due to the shielding action of the starting band. Calculating with the preferred width of starting bands, the expected lumen loss is in the range of 2-4 percent. A further drawback is that a conductive part is placed on a touchable portion of the lamp. When the hot cathode hits the wall of the glass tube at the end of the life of the lamp the wall may crack and a current path may be formed to the metallic starting band. Therefore the user of the lamp may be exposed to electrical shock.

U.S. Pat. No. 7,053,553 disclosed a starting aid comprising an electrical connector disposed in the plastic housing of the fluorescent lamp. The starting aid has a first end and a second end. The first end is connected to the means suitable for electrically connecting to the socket. The second end is secured to an end portion of an electrodeless discharge tube leg. At least a part of the electrical connector is formed as a spring. This lamp does not have an outer envelope and the discharge tube is secured in a plastic socket also comprising the starting aid. This starting aid can only be used in connection with a special discharge tube configuration without an outer envelope.

U.S. Pat. No. 6,051,930 disclosed a CFL system including a housing with a base connector, a ballast unit located in the housing and a lamp unit comprising a plurality of straight discharge tube members. The lamp unit is fixed rigidly to the housing and also includes an extended wire connection having, a first end electrically connected to one of the lamp electrodes and a second end located near another point on the lamp unit. This configuration favourably modifies the discharge path within the lamp unit but imposes an electric shock hazard due to the fact that the starting aid is in electrical connection with an electrode of the lamp unit and the lamp has no outer envelope.

The existing compact fluorescent lamps with an outer envelope on the market do not comprise starting aid means. CFL-s equipped with an outer envelope has plastic parts and glue/cement that fixes the discharge tube to the plastic housing. Thus there is a particular need to provide a compact fluorescent lamp with a starting aid which reduces the starting voltage of the fluorescent lamp significantly without decreasing the light output of the lamp and ensures safety against electric shock at the end of the life of the lamp. There is a further need to provide a mechanical support means that serves as a starting aid.

SUMMARY OF THE INVENTION

In an exemplary embodiment of the present invention, a compact fluorescent lamp having a principal axis and comprising a discharge tube is provided. The discharge tube is made of glass, encloses a discharge volume filled with a discharge gas, and has a fluorescent phosphor coating disposed on an inner surface portion of the tube. The tube forms a continuous arc path and is provided with electrodes disposed at each end of the arc path. The lamp also comprises a ballast unit for controlling current in the tube, which is connected to the electrodes and to an associated power supply. A bulb shaped outer envelope comprising a substantially spherical portion at least partly encloses the discharge tube and an elongated end portion at least partly encloses the ballast unit. The end portion of the outer envelope has a neck portion for receiving a base shell. The lamp also comprises at least one mechanical support and starting aid means for positioning the discharge tube and the ballast unit and for reducing the breakdown voltage path in the discharge tube.

In another exemplary embodiment of the invention, the neck portion of the compact fluorescent lamp may be provided with a retaining member. The compact fluorescent lamp further may comprise at least one mechanical support and starting aid means being made of an electrically conducting material and connected electrically to one of the electrodes. The at least one mechanical support and starting aid means is supported by the retaining member and clamped on the discharge tube at least at a location in a vicinity of a middle section of the arc path.

In an exemplary embodiment of another aspect of this invention, a mechanical support means is provided that serves as a starting aid in compact fluorescent lamps, where the mechanical support means comprises at least one first support section to provide support against the retaining member in the neck portion of the outer envelope, at least one second support section to provide support against an apex of the spherical part of the outer envelope, at least one first fixing section to provide fixing of the ballast unit, and at least one second fixing section to provide fixing of the discharge tube.

This configuration of the mechanical support means and the integration of the starting aid function have a number of advantages over the prior art. One advantage is that the starting voltage of the lamp is reduced significantly due to shortening of the breakdown voltage path by the starting aid. Another advantage is that the starting aid can provide a firm fixing and holding of the ballast subassembly and the discharge tube inside the lamp, eliminating any additional support means or the need for additional glue/cement material. In connection with a discharge tube having a coiled configuration, the maximum overall length of the lamps can be reduced. This design is also suitable for automatic assembly. A further advantage is that the lumen output of the lamp is not decreased by the starting aid. An electric shock hazard implied by the starting aid is avoided by the use of the outer envelope.

BRIEF DESCRIPTION OF THE DRAWINGS

The invention will now be described in detail with reference to the enclosed drawings, in which FIG. 6 shows a first embodiment of the mechanical support means and starting aid to be used in a self ballasted CFL with an outer envelope, FIG. 7 shows a second embodiment of the mechanical support means and starting aid, and FIG. 8 shows a third embodiment of the mechanical support means and starting aid.

DETAILED DESCRIPTION OF THE INVENTION

Figure 1:
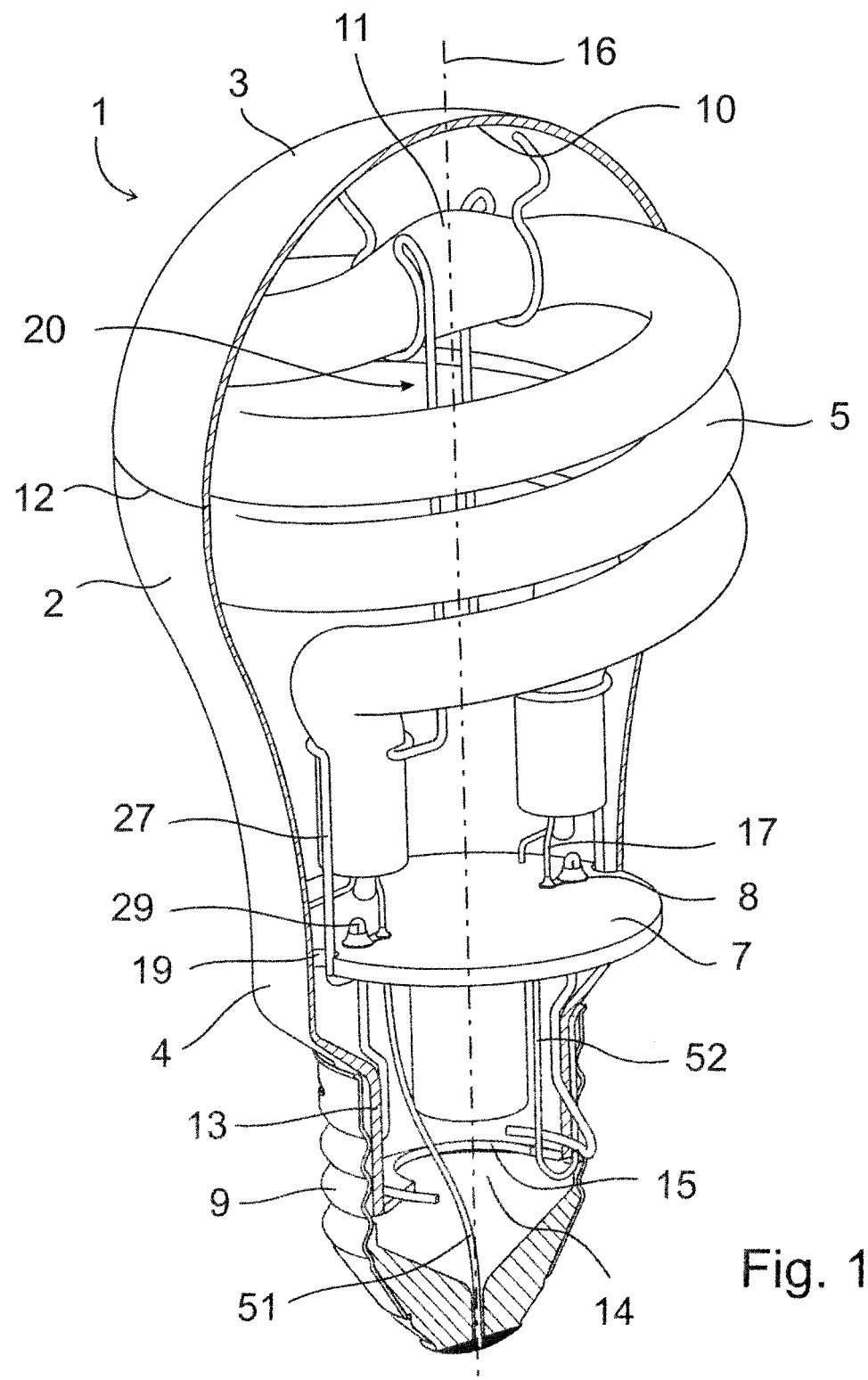
FIG. 1 shows a self ballasted compact fluorescent lamp with an outer envelope and a mechanical support means and starting aid.
Figure 2:
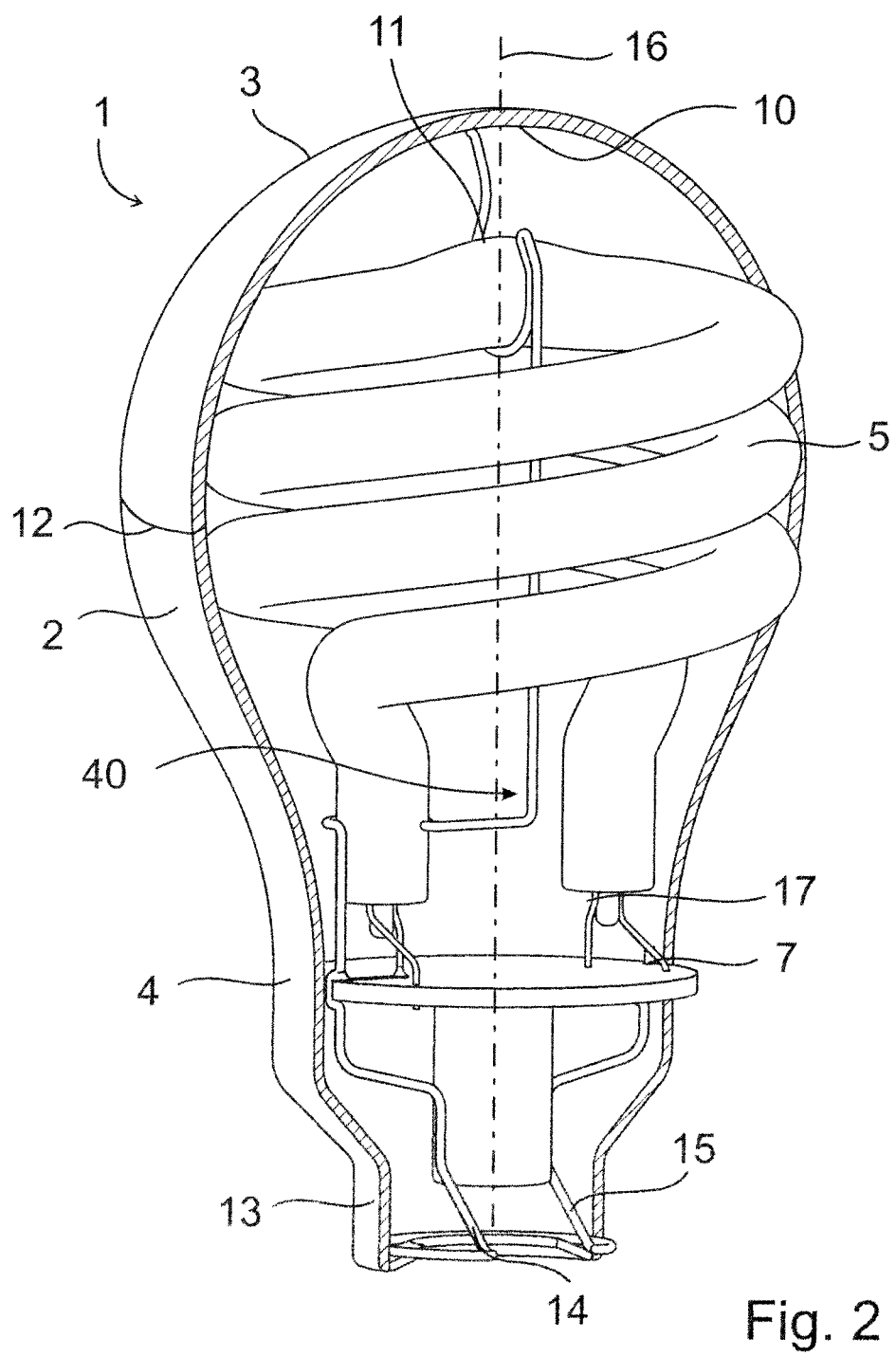
FIGS. 2, 3 shows another embodiment of the mechanical support means and starting aid fixed in a self ballasted CFL with an outer envelope.
Figure 3:
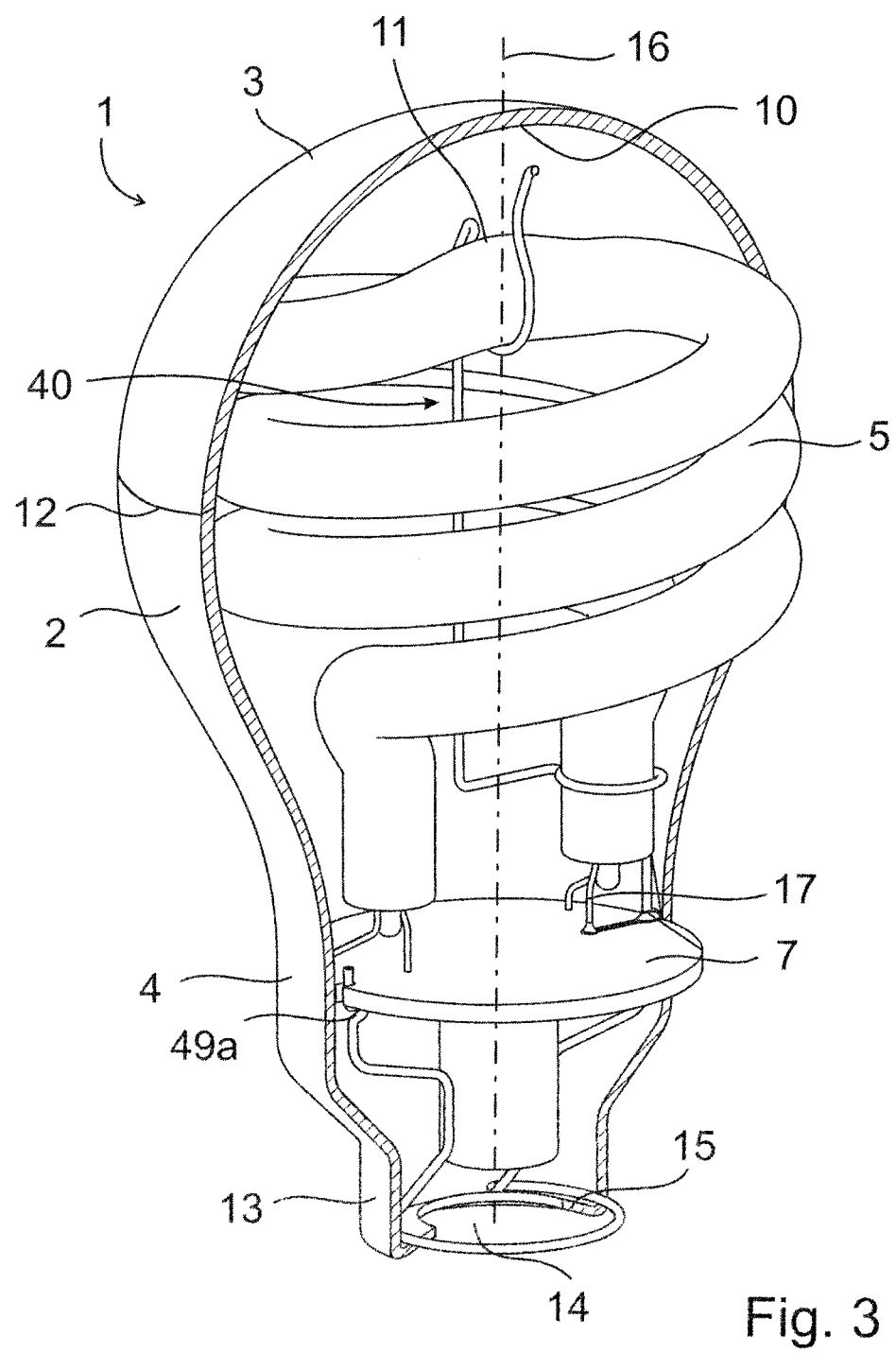
Figure 4:
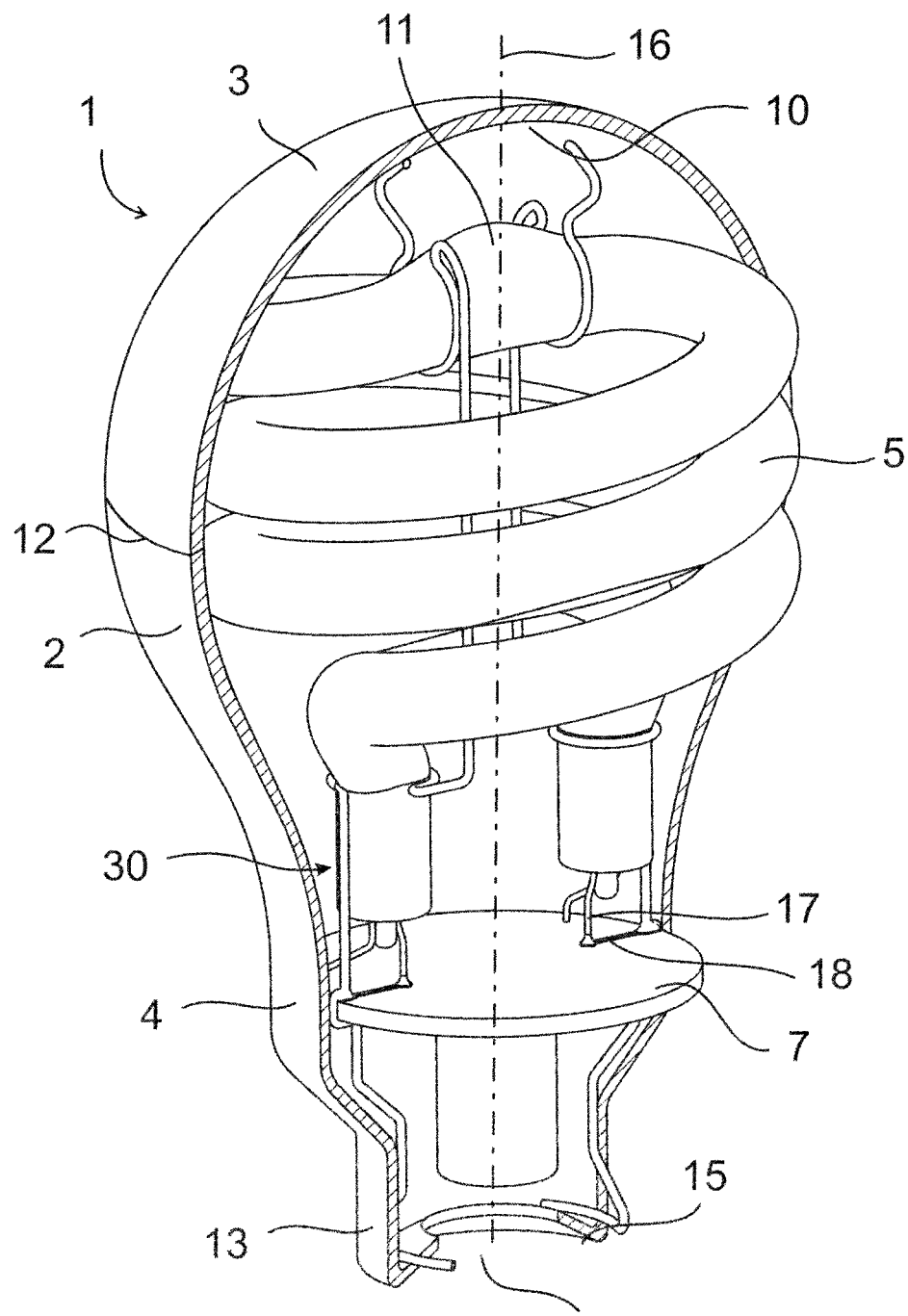
FIG. 4 shows a third embodiment of the mechanical support means and starting aid fixed in a self ballasted CFL with an outer envelope.

Referring first to FIGS. 1 to 5, a low-pressure compact fluorescent discharge lamp with a mechanical support and starting aid means is shown. FIG. 4 shows the same low-pressure discharge lamp configuration as seen in FIG. 1, but without outer envelope. The lamp 1 is a fluorescent discharge lamp, with a bulb shaped outer envelope 2 enclosing a discharge tube 5 and a ballast unit 7. The outer envelope 2 with a principal axis 16 has a spherical part 3 and an elongated part 4 with a neck portion 13. The neck portion 13 can be connected to a conventional base shell 9 as well known in the art. The neck portion may be open as illustrated in the figure or closed, as it is conventional in incandescent lamps. The compact fluorescent lamp also comprises two mechanical support and starting aid means 20 for positioning the discharge tube 5 and the ballast unit 7 and reducing a breakdown voltage path of the discharge tube. The outer envelope is comprised of two parts separated along a circumferential line 12 in a plane substantially perpendicular to the principal axis 16 of the envelope, the two parts of the envelope being connected and sealed to form a uniform bulb shaped envelope. The outer envelope 2 is cut in two parts and separated along a cutting line 12 in order that the ballast unit 7 and the discharge tube 5 can be inserted into the outer envelope 2. The details of the two-part outer envelope are described in copending U.S. patent application Ser. No. 11/827,040 filed on Jul. 10, 2007 which is hereby incorporated in its entirety by reference. The discharge tube 5 may comprise a single discharge tube or a plurality of elongated discharge tubes. As shown in FIG. 1, the discharge tube 5 is comprised of a single tube with substantially straight end sections and an intermediate portion between the end sections. The end sections are at one end of the tube in proximity to each other and the intermediate portion has a coiled configuration wound about the principal axis 16 of the lamp to provide a substantially homogenous illumination. The discharge tube is made of glass, encloses a discharge volume filled with a discharge gas, and has a fluorescent phosphor coating disposed on an inner surface portion of the tube. The ends of the tube are sealed in a gas tight manner. At the ends of the arc path, the tube is provided with electrodes and lead-in wires 17 connected to the electrodes. The lead-in wires 17 of the discharge tube 5 are connected to the ballast unit 7 for controlling the current in the discharge tubes. A printed circuit board carries at least a part of the components of the ballast unit 7. The printed circuit board is positioned substantially perpendicularly to the principal axis 16. The ballast unit 7 is further connected to contact terminals of the base shell 9 through lead-out wires 51, 52.

In order to provide visible light, the internal surface of the discharge tubes is covered with a fluorescent phosphor layer (not shown). This phosphor layer is within the sealed discharge volume. The composition of such a phosphor layer is known per se. This phosphor layer converts the short wave, mainly UVC radiation into longer wave radiation in the spectrum of visible light. The phosphor layer is applied to the inner surface of the discharge tube before it is sealed.

As shown in FIG. 1, the neck portion 13 has a retaining member 15 made of glass or of a material compatible with the material of the outer envelope 2. The retaining member 15 defines an opening 14, preferably a substantially circular opening for receiving the lead-out wires of the ballast unit to establish connection with an associated power supply through the base contact terminals. The retaining member 15 may be a ring-like portion. The discharge tube 5 and the ballast unit 7 are held and fixed relative to each other and inside the outer envelope through a mechanical support means with at least one first and second support section and at least one first and second fixing section. The first support section provides support against the retaining member 15 in the neck portion 13 of the outer envelope 2. The second support section provides support against the apex 10 of the outer envelope. The support of the first and second support sections may be flexible if the application requires so. The first fixing section is used for fixing of the ballast unit 7 and the second fixing section is used for embracing the discharge tube 5 at least at a location in a vicinity of a middle section of the arc path where the cold spot 11 of the tube is formed. In order to have a mechanical support means that also functions as a starting aid, it has to be made of an electrically conductive material and an electric connection has to be established between an electrode and the joint mechanical support and starting aid means 20. In the shown embodiment, the mechanical support means 20 is electrically connected to the lead-in wire 17, which in turn is connected to the electrode. In such a configuration, the mechanical support means will also serve as a starting aid due to the fact that it reduces the length of the breakdown voltage path. The mechanical support and starting aid means provides on one hand for easy starting of the CFL and on the other hand for protection of the lamp against mechanical vibration and shocks.

The mechanical support means 20, 30, 40, as shown in FIGS. 6 to 8, is configured to provide support and fixing of different parts of the discharge tube and the ballast unit or the lamp ballast assembly. Thus, the mechanical support means is configured and formed to provide support, preferably a flexible support of the discharge tube relative to the outer envelope. Further, the mechanical support means is configured and formed to provide support, preferably a flexible support of the ballast unit relative to the outer envelope. The mechanical support means is further configured and formed to provide a fixing of position between the discharge tube and the ballast unit. To this end, the mechanical support means is made of a metal wire with sufficient strength and flexibility.

The mechanical support means 20, 30, 40 comprises at least one first support section 21, 31, 41 to provide support against a retaining member 15 of the neck portion 13 and at least one second support section 22, 32, 42 to provide support against the apex 10 of the outer envelope 2. The mechanical support means also comprises at least one first fixing section 25, 35, 45 for fixing the ballast circuit board 7 and at least one second fixing section 23, 24, 33, 34, 43, 44 for fixing the discharge tube 5.

The first support section 21, 31, 41 of the mechanical support means has a curved form following the inner surface of the neck portion of the outer envelope. The retaining member of the neck portion is formed in a way to provide a firm support of the mechanical support means. The second support section 22, 32, 42 has a substantially U-shaped form with one end being pressed against an apex 10 of the outer envelope. The first fixing section 25, 35, 45 is configured and formed to provide an embracing fixing of the ballast unit at an edge region of the printed circuit board. The second fixing sections have a circular spring form encircling the discharge tube along a large part of its outer perimeter in order to provide a snap-in connection between the support means and the discharge tube. The second fixing section has a first spring section 23, 33, 43 in the middle region of the discharge tube 5 and a second spring section 24, 34, 44 in the end region of the discharge tube 5. The first spring sections provide for a mechanical fixing of the middle section of the discharge tube having a coiled configuration while the spring like snap-in connection of the mechanical fixing means, preferably a resilient metal wire, embraces the discharge tube on one or both sides of a cold spot protrusion as shown in FIGS. 1 to 5.

The mechanical support means being made of a conductive material, preferably of a metal wire, may be connected to an electrode of the discharge tube. Due to the configuration of the mechanical fixing means 20, 30, 40 with the spring like snap-in connection; the electrical potential of the connected electrode is led to the middle region of the discharge tube, which reduces the length of the discharge path. This is especially advantageous during starting. According to measurements, the starting voltage of a T2 8 W spiral lamp in instant mode was 335V without the starting aid. With a starting aid shown in the accompanying drawing (FIGS. 1 to 8), the same test resulted in a starting voltage of 295V. The difference is 40V, i.e. 12% of the original value.

It may be apparent to those skilled in the art, that a reduced starting voltage may lead to cheaper and/or smaller components in the ballast circuitry. This may also lead to a simplified manufacturing process of the ballast unit.

Figure 5:
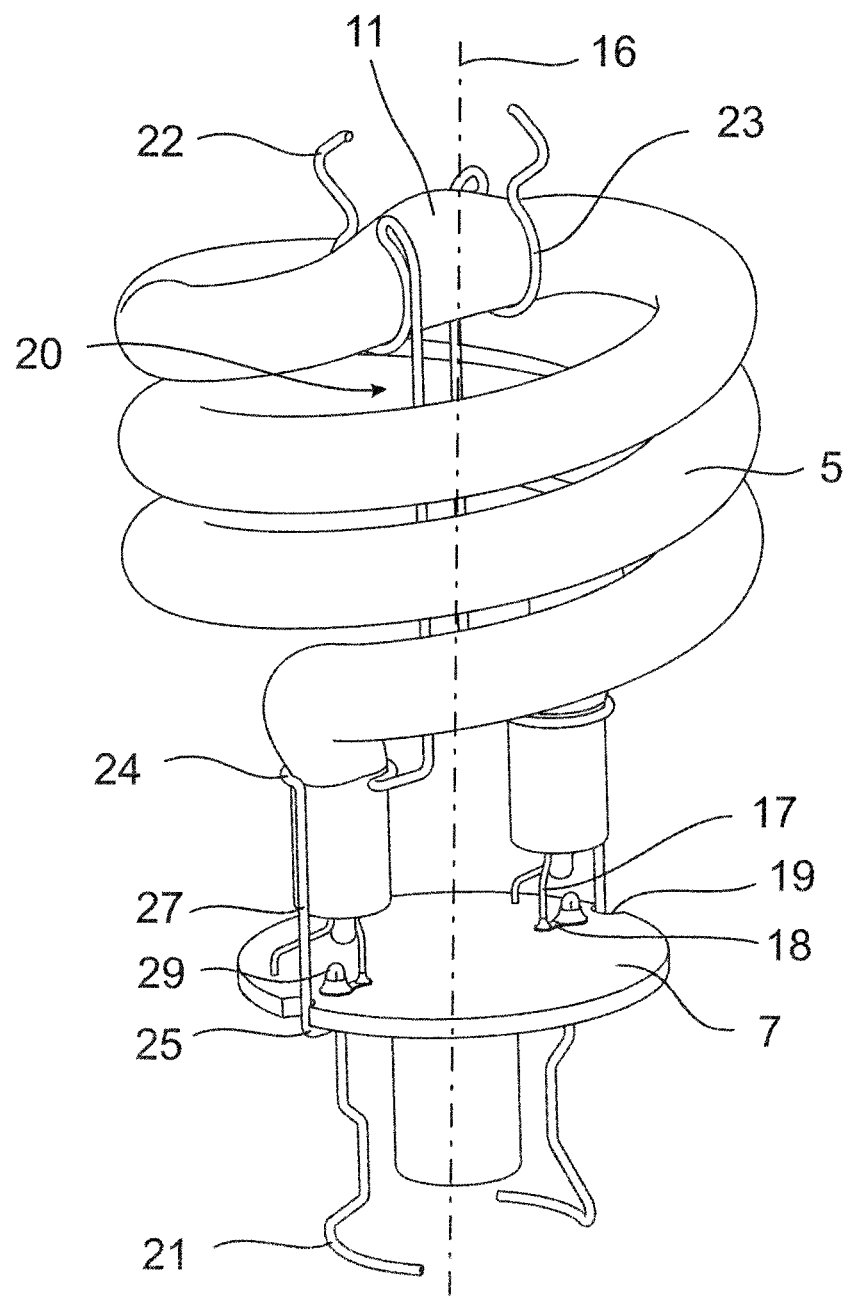
FIG. 5 shows the self ballasted CFL of FIG. 1 with a mechanical support means and a starting aid, without the outer envelope.

As shown in FIGS. 1, 5 and 6, the first fixing section 25 has a substantially U-shaped form with a pin like extension penetrating the printed circuit board carrying the ballast unit thereby defining a pin and hole fixing structure. The edge region of the printed circuit board comprises a hole 8 for receiving a pin section 29 and a cutout section 19 for receiving a second connecting section 27 of the mechanical support means 20 in proximity of each other. The bottom part of the fixing section 25 is formed in a way that the circuit board can rest on it. The first fixing section 25 provides for a firm fixing of the ballast unit at the edge region of the printed circuit board.

The electrical connection between the mechanical support means and an electrode of the discharge tube is established, as depicted in FIG. 5, by electrically connecting the mechanical support means in the range of the first fixing section 25, 35, 45 to a lead-in wire 17 of an electrode. This connection can be prepared on either side of the printed circuit board by a connecting wire 18 of an electrically conducting material, the ends of which are fixed to the mechanical support means and the electrode of the discharge tube, respectively. For this purpose, any type of joints that provide electrical connection, such as soldering, wrapping, pressing or the like, may be used. In the exemplary embodiment shown in FIGS. 1, 4 and 5, the connection is made on the upper side of the printed circuit board. It may also be apparent that connecting one of the electrodes of the lamp to the fixing section of the starting aid might further increase the stability of the entire ballast subassembly, since the electrical connection also provides a mechanical joint between the metal wire of the support means and the electrodes. As seen in FIGS. 1, 4 and 5, an electrical connection is made between the lead-in wires 17 and the fixing section at both ends of the discharge tube. This is due to the fact that the mechanical support means comprises two separate pieces, which are not connected to each other electrically. Such a two-piece mechanical support means is shown in FIGS. 1, 4 and 5.

In an embodiment, the mechanical support means and starting aid 30, 40 has a different shape. As seen in FIGS. 2, 4, 7 and 8, the first fixing section 35, 45 has a substantially U-shaped form with two shaft portions substantially parallel to the plane of the printed circuit board of the ballast unit and a bottom portion substantially perpendicular to the shaft portions for holding and fixing the printed circuit board at the side region. This configuration may be advantageous due to the fact, that the printed circuit board does not comprise holes for leading the fixing section of the mechanical support means through, as seen in FIG. 1.

Referring now to FIGS. 6 to 8, different embodiments of the mechanical support and starting aid means 20, 30, 40 are shown. As it is clear from the drawing, the mechanical support and starting aid means is made of a single metal wire which is bent in order to comprise the different parts and sections mentioned above in this specification. FIGS. 6 and 7 illustrate embodiments, in which the mechanical support means and starting aid 20, 30 is comprised of two individual pieces and therefore it is made of two separate wires. FIG. 8 however shows an embodiment, where the mechanical support and starting aid means 40 is comprised of one single piece only and therefore it is made of one single metal wire with one substantially vertical piece similar to the embodiments shown in FIGS. 6 and 7 and a substantially horizontal connecting portion. The directions vertical and horizontal are used in connection with the drawing held in an upright position relative to the reference numerals part (landscape orientation of the page).

As shown in FIGS. 6 and 7, the mechanical support and starting aid means 20, 30 comprises a first support section 21, 31 which is connected to a first fixing section 25, 35 by a first connecting section 26, 36. The first support section 21, 31 has a substantially circular form following the inner surface of the neck portion of the outer envelope and is held in this position by the retaining member 15 (FIGS. 1, 4). The first connecting section 26, 36 has an angular form following at least partly the inner surface of the neck portion of the outer envelope. The first fixing section 25, 35 is connected to a lower second fixing section 24, 34 by a second connecting section 27, 37, which is substantially linear. The lower second fixing section 24, 34 is connected to an upper second fixing section 23, 33 by a third connecting section 28, 38 which has a substantially linear middle section and angular end sections. The upper second fixing, section 23, 33 is connected directly to a second support section 22, 32. The second support section 22, 32 is held in its position by the apex 10 of the outer envelope (see FIGS. 1, 4). The embodiment shown in FIGS. 6 and 7 differs in the shape of the first fixing section 25 and 35 as already disclosed in detail above. In these configurations both of the electrodes may be connected to the mechanical support means in order to be used as a starting aid, since the two pieces of the mechanical support means are electrically isolated from each other. This configuration does not require any additional support for holding the ballast/lamp subassembly.

Referring now to FIG. 8, another embodiment of the mechanical support means and starting aid 40 is shown. In this embodiment, a substantially horizontal connecting portion connects two substantially vertical pieces. One of the substantially vertical pieces of the mechanical support means comprises a first support section 41, which is connected to a first fixing section 45 by a first connecting section 46. The first support section 41 has a substantially circular form following the inner surface of the elongated portion of the outer envelope and is held in his position by the retaining member of the neck portion. The first connecting section 46 has an angular form following at least partly the inner surface of the neck portion. The first fixing section 45 is connected to a lower second fixing section 44 by a second connecting section 47, which is substantially linear. The lower second fixing section 44 is connected to an upper second fixing section 43 by a third connecting section 48 which has a substantially linear middle section and angular end sections. The upper second fixing section 43 is connected directly to a second support section 42. The second support section 42 is held in its position by the apex 10 of the outer envelope. Obviously, in this configuration only one electrode may be connected to the mechanical support means in order to be used as a starting aid, since connecting both electrodes would lead to a short-circuit. In the shown embodiment, the vertical part of the mechanical support means is located substantially in the central longitudinal or principal axis of the discharge tube, therefore only one vertical part of full length is necessary, resulting in a shorter metal wire. The second vertical part may be shorter comprising only a first fixing section 49 with a supporting member 49a.

FIGS. 2 and 3 illustrate an embodiment of the compact fluorescent lamp with a mechanical support and starting aid means 40 shown in FIG. 8. As it can be seen in the figures, the vertical parts of full length and short length have a first fixing section of different form for fixing a carrier plate such as a printed circuit board of the ballast unit. The full length vertical part has a first embracing fixing section 45 with a substantially U-shaped form having two shaft portions substantially parallel with the plane of the printed circuit board of the ballast unit and a bottom portion substantially perpendicular to the shaft portions for holding and fixing the printed circuit board at a side region (FIG. 2). This full length vertical part further comprises a second snap-in fixing section upper part for fixing the middle section of the discharge tube near the cold spot and a second snap-in fixing section lower part for fixing the straight end section of the discharge tube. The short length vertical part has a first fixing section 49 with a supporting member 50 as best seen in FIG. 3. This configuration provides substantially for the same starting aid effect, requires however only a shorter metal wire. As the two vertical parts are electrically connected to each other, only one of the vertical parts, in the shown example the longer part is electrically connected to an electrode of the discharge tube.

The invention is not limited to the shown and disclosed embodiments, but other elements, improvements and variations are also within the scope of the invention. For example, it may be apparent to those skilled in the art that a number of other forms of the starting aid may be applicable for the purposes of the present invention. Although the discharge tube has been shown in a coiled configuration, it may be apparent to those skilled in the art, that any other form of the discharge tube, such as a multi finger form, is also suitable for the purposes of the invention.

The invention claimed:

1. A compact fluorescent lamp having a principal axis and comprising
    a discharge tube made of glass, enclosing a discharge volume filled with a discharge gas, and having a fluorescent phosphor coating disposed on an inner surface portion of the tube, the tube forming a continuous arc path and further being provided with electrodes disposed at each end of the arc path;
    a ballast unit for controlling current in the tube and being connected to the electrodes;
    a bulb-shaped outer envelope comprising a substantially spherical portion at least partly enclosing the discharge tube and an elongated end portion at least partly enclosing the ballast unit;
    the end portion of the outer envelope having a neck portion for receiving a base shell; and
    at least one joint mechanical support and starting aid mechanism for positioning the discharge tube and the ballast unit and reducing a breakdown voltage path of the discharge tube, the mechanical support in abutting, non-fixed engagement the outer envelope and encircling a large part of an outer perimeter of the discharge tube along a distal end thereof opposite the ballast unit to reduce a length of the discharge path.

2. The compact fluorescent lamp of claim 1, in which the neck portion has a retaining member, the mechanical support and starting aid mechanism is made of electrically conducting material and connected electrically to one of the electrodes, said mechanism is supported by the retaining member and clamped on the discharge tube at least at a location in a vicinity of a middle section of the arc path.

3. The compact fluorescent lamp of claim 1, in which the mechanical support and starting aid mechanism is configured and formed to provide support for the discharge tube relative to the outer envelope.

4. The compact fluorescent lamp of claim 1, in which the mechanical support and starting aid mechanism is configured and formed to provide support for the ballast unit relative to the outer envelope.

5. The compact fluorescent lamp of claim 1, in which the mechanical support and starting aid mechanism is configured and formed to provide fixing of position between the discharge tube and the ballast unit.

6. The compact fluorescent lamp of claim 1, in which the mechanical support and starting aid mechanism is made of a metal wire.

7. The compact fluorescent lamp of claim 1, in which the discharge tube comprises substantially straight end sections and an intermediate portion between the end sections and the end sections are at one end of the discharge tube in proximity to each other and the intermediate portion has a coiled configuration.

8. A compact fluorescent lamp having a principal axis and comprising
   a discharge tube made of glass, enclosing a discharge volume filled with a discharge gas, and having a fluorescent phosphor coating disposed on an inner surface portion of the tube, the tube forming a continuous arc path and further being provided with electrodes disposed at each end of the arc path;
   a ballast unit for controlling current in the tube and being connected to the electrodes;
   a bulb-shaped outer envelope comprising a substantially spherical portion at least partly enclosing the discharge tube and an elongated end portion at least partly enclosing the ballast unit,
   the end portion of the outer envelope having a neck portion for receiving a base shell,
   the neck portion having a retaining member;
   at least one mechanical support and starting aid mechanism being made of an electrically conducting material and connected electrically to one of the electrodes;
   the mechanical support and starting aid mechanism being supported by the retaining member without engaging the outer envelope and having a circular spring form encircling a large part of an outer perimeter of the discharge tube and clamped on the discharge tube at least at a location in a vicinity of a middle section of the arc path at a distal end of the discharge tube opposite the ballast unit.

9. The compact fluorescent lamp of claim 8, in which the retaining member is a ring-like portion made of a material compatible with the material of the outer envelope.

10. The compact fluorescent lamp of claim 8, in which the retaining member is a ring-like portion formed from the material of the outer envelope.

11. The compact fluorescent lamp of claim 8, in which the lamp comprises two separate mechanical support and starting aid mechanisms, at least one said mechanisms is connected electrically to one of the electrodes.

12. The compact fluorescent lamp of claim 8, in which the mechanical support and starting aid mechanism is attached by an embracing fixing portion to an edge region of a printed circuit board carrying at least a part of the components of the ballast unit and being positioned substantially perpendicularly to the principal axis.

13. The compact fluorescent lamp of claim 8, in which the mechanical support and starting aid mechanism is attached by a pin and hole structure to a printed circuit board carrying at least a part of the components of the ballast unit and being positioned substantially perpendicularly to the principal axis.

14. The compact fluorescent lamp of claim 8, in which the discharge tube comprises substantially straight end sections and an intermediate portion between the end sections and the end sections are at one end of the discharge tube in proximity to each other and the intermediate portion has a coiled configuration, and the mechanical support and starting aid mechanism is clamped on the discharge tube at a location in a vicinity of the straight end sections by at least partially embracing the substantially straight end sections.

15. The compact fluorescent lamp of claim 8, in which the mechanical support and starting aid mechanism embraces the discharge tube at least partially at a location in the vicinity of the middle section of the arc path.

16. The compact fluorescent lamp of claim 8, in which the mechanical support and starting aid mechanism has a substantially U-shaped form at an end portion thereof, and one end of the substantially U-shaped form is pressed against an apex portion of the outer envelope.

17. The compact fluorescent lamp of claim 8, in the mechanical support and starting aid mechanism is bent from one single wire.

18. A mechanical support for a compact fluorescent lamp, the lamp having a principal axis and comprising
   a discharge tube made of glass, enclosing a discharge volume filled with a discharge gas, and having a fluorescent phosphor coating disposed on an inner surface portion of the tube, the tube forming a continuous arc path and further being provided with electrodes disposed at each end of the arc path;
   a ballast unit for controlling current in the tube and being connected to the electrodes;
   a bulb-shaped outer envelope having an apex and comprising a substantially spherical portion at least partly enclosing the discharge tube and an elongated end portion at least partly enclosing the ballast unit,
   the end portion of the outer envelope having a neck portion for receiving a base shell,
   the neck portion having a retaining member made of a material compatible with the material of the outer envelope;
   the mechanical spaced in abutting, non-engaged relation with the outer envelope support comprising
   at least one first support section to provide flexible support against the retaining member in the neck portion of the outer envelope;
   at least one second support section to provide flexible support against the apex of the outer envelope;
   at least one first fixing section to provide fixing of the ballast unit at a first end; and
   at least one second fixing section having a circular form that extends about a large part of an outer perimeter to provide a snap-in fixing of the discharge tube therein at a second end opposite the first end.

19. The mechanical support of claim 18, in which the first support section has a curved form following an inner surface portion of the neck portion of the outer envelope.

20. The mechanical support of claim 18, in which the second support section has a substantially U-shaped form, and one end of the substantially U-shaped form is pressed against the apex of the outer envelope.

21. The mechanical support of claim 18, in which the first fixing section is configured and formed to provide fixing of a printed circuit board of the ballast unit at an edge region.

22. The mechanical support of claim 18, which has a second spring section damping on the discharge tube in the vicinity of the end of the arc path.

23. The mechanical support of claim 18, in which the support is electrically connected to one of the electrodes.

24. The compact fluorescent lamp of claim 1, in which the outer envelope is comprised of two parts separated along a circumferential line in a plane substantially perpendicular to the principal axis of the lamp, the two parts of the envelope being connected and sealed to form a uniform bulb-shaped envelope.

* * * * *